Aug. 19, 1952  R. R. ENGLISH ET AL  2,607,238

GEAR DRIVE

Filed April 28, 1951

Inventors
Robert R. English
Norman Cappelle
by Robert L. Kahn
Attorney.

Patented Aug. 19, 1952

2,607,238

UNITED STATES PATENT OFFICE 2,607,238

GEAR DRIVE

Robert R. English and Norman Cappelle, Chicago, Ill., assignors to Oak Mfg., Co., a corporation of Illinois Application April 28, 1951, Serial No. 223,499

3 Claims. (Cl. 74—440)

This invention relates to a gear drive and particularly to the type of drive used where no backlash or lost motion is permitted. Thus for example, the mechanical drive between a knob and a tuning element in many electrical devices such as radio receivers, transmitters, signal generators and the like, generally provides for a substantial reduction in speed without any backlash or lost motion. While the drives in above devices are frequently frictional, many such drives include a train of gears with or without additional frictional means.

A common form of drive for tuning condensers, or the like, consists of a pair of twin gears in face to face relation to function as a single gear. These two gears are angularly offset from each other by one or more springs, the offset amounting to a fraction of a gear tooth. Thus, the net effect is to maintain a tight fit between meshing gear teeth so that all backlash with one adjacent gear is eliminated. Such a conventional drive is satisfactory where backlash between two successive gears in a gear train is to be eliminated. However, where there are three or more gears to the gear train, it is found that the backlash between one composite gear and another gear is eliminated but that backlash between a composite gear and a third gear is still present.

This invention aims to provide a gear construction wherein backlash will be eliminated substantially completely in a gear train consisting of three gears. In a gear train using a larger number of gears, it is possible to have every third gear made as disclosed herein with the remaining gears of conventional construction. This is in distinction to the composite gear of the prior art wherein every other gear would have to follow this construction. Inasmuch as such composite gears are substantially more expensive than conventional gears, it will be appreciated that a substantial saving is effected by virtue of the present invention.

In general, the invention utilizes a pair of gears in face to face relation as in a conventional structure described above. Such conventional structures customarily mount one gear rigidly upon the pin while the twin gear is mounted for rotation with respect to the first gear, the rotational mounting being snug enough so that the two gears can only rotate with respect to each other but have no other substantial movement. In accordance with this invention, the twin gears are so mounted with respect to each other that a certain amount of universal movement, both rotational and rocking is permitted. The two gears are spring biased with respect to each other, the springs preferably being disposed at spaced regions around the axis of the two gears.

In order that the invention may be further understood, reference will now be made to the drawings, wherein.

Figure 1:
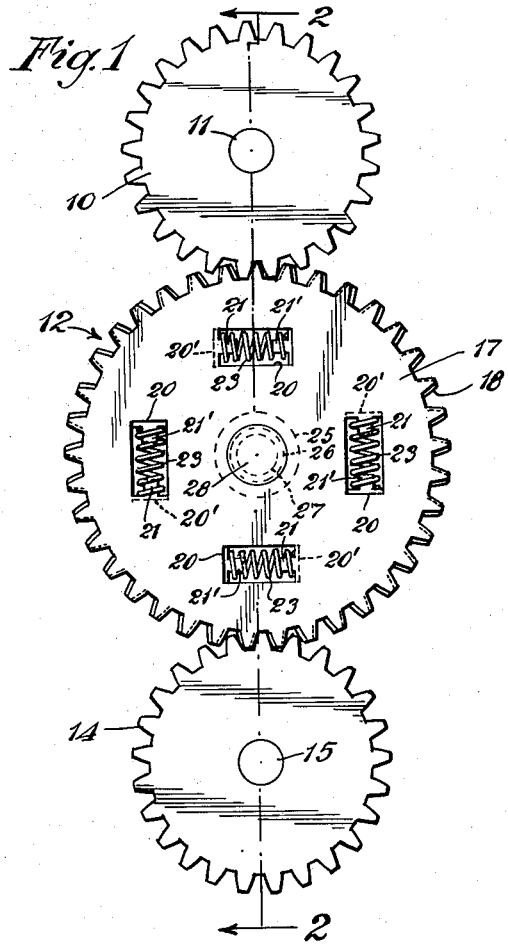
Figure 1 shows an elevation of a three-gear train with one of the gears embodying the invention.
Figure 2:
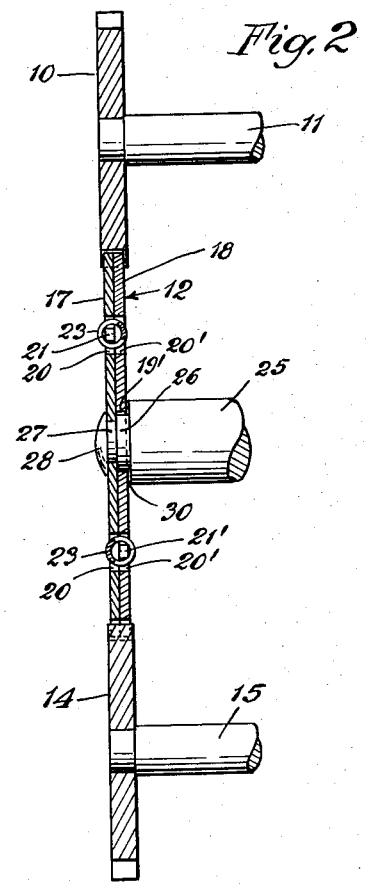
Figure 2 is a section along line 2—2 of Figure 1.
Figure 3:
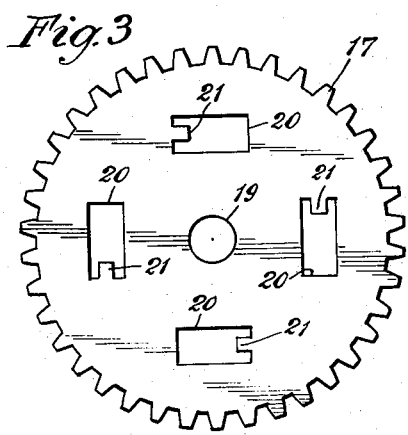
Figures 3 and 4 are views of the two gear blanks used in making the composite gear involving the present invention.
Figure 4:
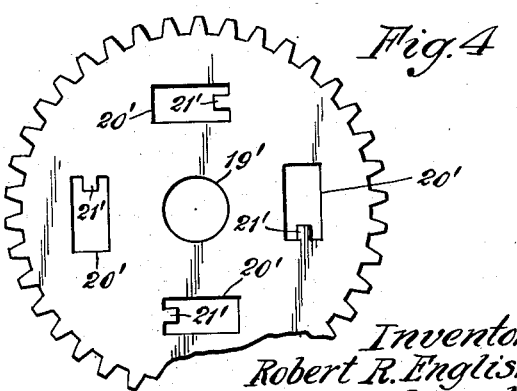

A gear train may have driving pinion 10 mounted on shaft 11 meshing with composite gear generally indicated by numeral 12 which in turn meshes with driven gear 14 mounted on shaft or pin 15. Any one of the three gears may be the driver. In practice, the three gears are usually the flat gears having conventional gear teeth. However, any or all of the gears may be of special type or even worm gears. The gears may be of any desired material, such as metal, plastic, fiber or the like.

Referring specifically to composite gear 12, this consists of twin gears 17 and 18 identical in size and construction, except for accommodating the shaft. Thus, gear 17 has aperture 19 in the center thereof for accommodating a shaft or pin. Gear 17 also has a number of slots 20, here shown as four, uniformly distributed around shaft hole 19. Slots 20 are generally rectangular with finger 21 extending inwardly of the slot at one end thereof. All slots 20 in gear 17 are similar and tongue 21 occurs at the same end of the slot.

Corresponding gear 18 has aperture 19' substantially larger than aperture 19 of gear 17. The gear 18 has slots 20' and tongue 21' identical with slots 20 and tongue 21. In fact, except for apertures 19 and 19' in the two gears, the two gears are identical even as regards slots. However, it will be noted that one gear is reversed with respect to the other so that tongue 21 in one gear is opposed to tongue 21' in the companion gear.

Gears 17 and 18 are assembled in aligned relation so that slots 20 and 20' register and tongues 21 and 21' are opposed to each other. Suitable springs 23 are disposed in the slots, opposing tongues 21 and 21' retaining the springs in position.

Gears 17 and 18 are mounted upon stub shaft 25. Stub shaft 25 has stepped parts 26 and 27. The assembled gears are disposed upon the stepped end of shaft 25 with gear 18 having larger aperture 19' disposed over step 26. Gear 17 with smaller aperture 19 is disposed on step 27. In order to maintain the assembled gears in position, the end of the shaft may be turned over or peaned as shown at 28. It is immaterial whether gear 17 is rotatable with respect to shaft 25 or is locked rigidly thereto. In practice, shaft 25 may be fixed and end portion 28 may be turned over just enough so that gear 17 is snug on the reduced end of the pin.

It will be noted that stepped portion 26 of the pin is small enough so that a substantial clearance 30 is provided between step 26 and the inside surface of gear 18 forming aperture 19. Thus for example, the clearance at stepped portion 26 may be of the order of four or five thousandths of an inch. A larger or smaller clearance may be provided depending upon the accuracy of the gears, the amount of tolerances in the various shafts and pins and other factors. It will be clear, that gear 18 will be offset from 17 by springs 23. Because of clearance 30, gear 18 will be permitted to have a limited universal motion and take up the backlash for both gears 10 and 14.

What is claimed is:

1. A composite gear for use in a gear train, said gear comprising a pair of twin gears, said gears being similar and having a number of slots in the body of the gear, said gears being adapted to be disposed in face to face relation to form one composite gear, springs in said slots tending to bias one gear rotatably with respect to the other gear, means for mounting one gear with substantially no play perpendicular to the gear axis so that it is only free for rotation and means for mounting said other gear to provide play perpendicular to the gear axis so that it is free to rotate and also free to move generally a small amount whereby said second gear may have a limited amount of universal motion with respect to the first gear and pick up backlash on gears ahead of and behind the composite gear.

2. A composite gear for use as an intermediate gear in a gear train and adapted to eliminate backlash on both the driving and driven gears, said composite gear consisting of a pair of twin gears mounted in face to face relation to function as one gear, spring means for rotatably biasing one gear with respect to its twin, a pin for supporting said two gears, said pin having a snug fit for one gear to provide for rotation with substantially no play perpendicular to the gear axis, said pin having a loose fit for the second gear to provide for rotation and some play perpendicular to the gear axis.

3. The construction according to claim 2, wherein said two gears have a plurality of slots with springs in said slots for obtaining the spring bias between the twins and wherein a member having stepped parts is provided for supporting said twins, one of the stepped portions having clearance with respect to its gear twin so that said clearance permits substantial lateral movement of said gear twin in addition to rotation.

ROBERT R. ENGLISH.
NORMAN CAPPELLE.

REFERENCES CITED

The following references are of record in the file of this patent:

UNITED STATES PATENTS

| Number | Name | Date |
| --- | --- | --- |
| 1,648,715 | Bean | Nov. 8, 1927 |
| 2,092,888 | MacCoul | Sept. 14, 1937 |
| 2,310,232 | Hale | Feb. 9, 1943 |
| 2,311,902 | Roethal, Jr. | Feb. 23, 1943 |
| 2,343,110 | Hale | Feb. 29, 1944 |